United States Patent

[15] 3,647,296

Long [45] Mar. 7, 1972

[54] LIGHT-MONITORING DEVICE FOR USE WITH COLOR PHOTOGRAPHIC APPARATUS

[72] Inventor: John Geoffrey Long, Surbiton, England
[73] Assignee: The Pavelle Corporation, New York, N.Y.
[22] Filed: Mar. 9, 1970
[21] Appl. No.: 17,586

[30] Foreign Application Priority Data

Mar. 7, 1969 Great Britain.......................12,240/69

[52] U.S. Cl..............................................355/38, 355/68
[51] Int. Cl..............................................G03b 27/76
[58] Field of Search..............................................355/38, 68

[56] References Cited

UNITED STATES PATENTS 3,521,952   7/1970   Nelson et al.............................355/38

FOREIGN PATENTS OR APPLICATIONS 1,214,525   4/1966   Germany...................................355/38

Primary Examiner—Joseph F. Peters, Jr.
Assistant Examiner—Richard A. Wintercorn
Attorney—Darby & Darby

[57] ABSTRACT

Light-monitoring apparatus is disclosed for use with a color printing process in which the mean printing conditions are determined and applied to all prints. Three photoelectric transducers responsive to the primary colors are arranged to receive light from the source, after filtering, with such light being screened from the photosensitive material on which the prints are formed. The exposure times for the process are then determined by the average intensity of the light impinging upon the photocells. The photocells may also be partially responsive to light passing through the negative or transparency to correct partially for density and/or color changes from transparency to transparency.

2 Claims, 1 Drawing Figure

PATENTED MAR 7 1972  3,647,296
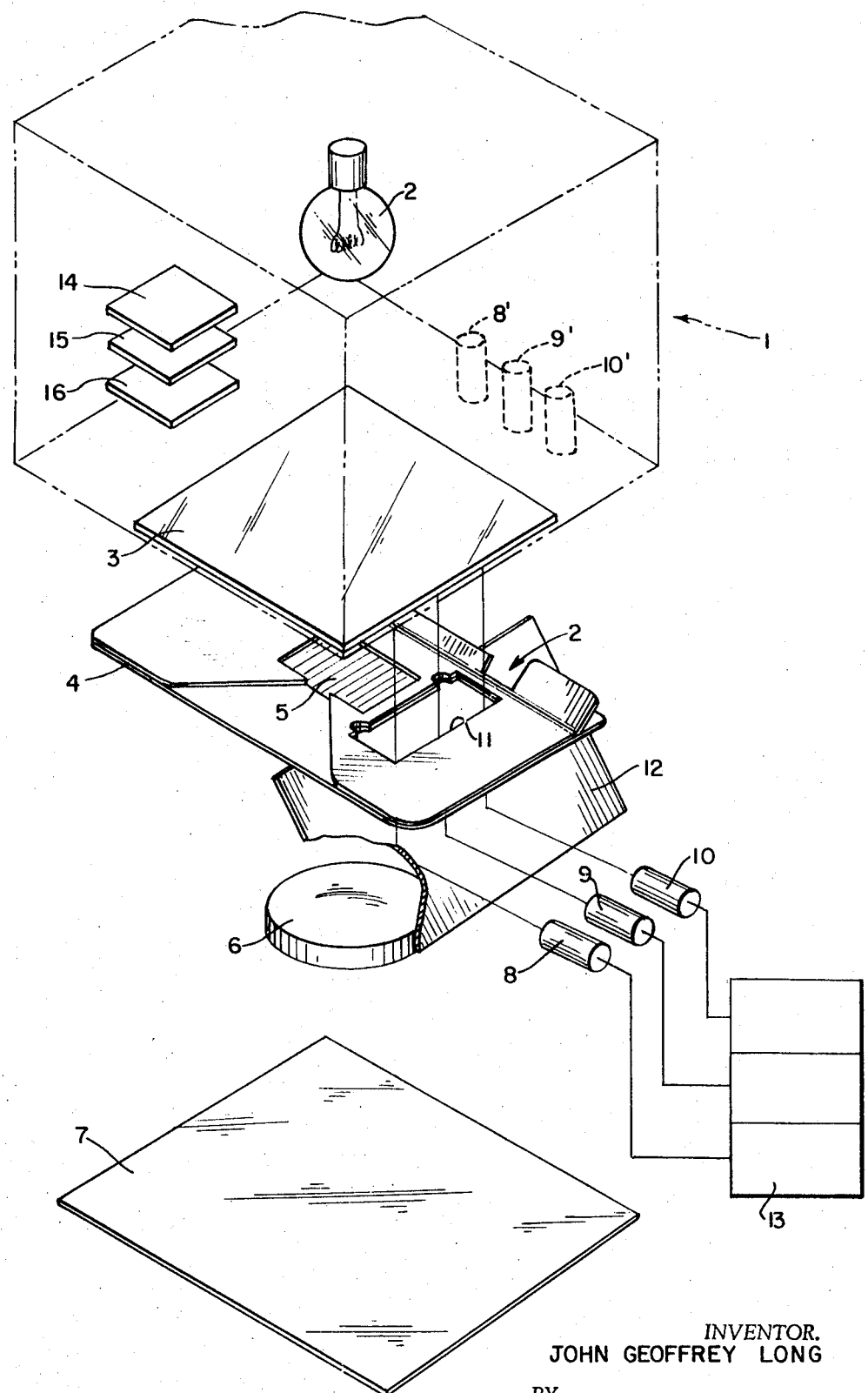
INVENTOR.
JOHN GEOFFREY LONG
BY Darby & Darby
ATTORNEYS

LIGHT-MONITORING DEVICE FOR USE WITH COLOR PHOTOGRAPHIC APPARATUS

This invention concerns improvements in or relating to the production of photographic color prints from color negatives or transparencies.

Where a large number of negatives or transparencies are made under identical conditions with the only variation being the subject e.g., in school portraiture), it is common to select one or more sample negatives or transparencies as being fairly representative of the many negatives or transparencies made, to print these samples by a trail-and-error process, noting the printing conditions which resulted in an acceptable print for each sample and, from the resulting data, to select average printing conditions. The printer can then be adjusted so as to operate under the average conditions derived and all of the negatives or transparencies printed under these fixed conditions. The parameters of the printing conditions determined will depend upon the type of printing apparatus employed and upon its mode of operation.

In one form of color printing apparatus, the printing light color composition is corrected by inserting into the printing light beam a filter pack of appropriately selected color filters, the disposition of the filters in the beam being unchanged throughout the printing of all negatives or transparencies taken, with all negatives or transparencies being printed with the same exposure times. In this case the conditions determined are the mean color composition of the printing light (as determined by the filters in the selected filter pack) and the mean exposure times. When the number of negatives or transparencies is considerable, e.g., five hundred to a thousand as in a school portraiture, there is often a progressive deterioration in the colors of the prints as the printing of the batch of negatives or transparencies progresses. This deterioration is a result, firstly, of changes in the intensity of and/or the color temperature of the light output of the lamp producing the printing light and, secondly, of fading of the filters. The lamp in a photographic color printer generally is over-run and thus ages relatively quickly, with its light output intensity usually falling to about one-half of its original light output intensity during its useful life. The filters used in photographic color printers are exposed to the very intense light from the printing lamp and to the fairly intense radiant heat in the printing light beam and, as a result, can deteriorate fairly rapidly.

It is the object of this invention to provide a method and an apparatus for printing color negatives or transparencies which will overcome or at least substantially reduce the above-mentioned disadvantage.

According to this invention there is provided light-monitoring apparatus for use in printing a large number of photographic color negatives or transparencies under substantially identical conditions with the only variation being the subject, wherein the negatives or transparencies are sampled to determine mean printing conditions substantially applicable to the printing of all of said negatives or transparencies, and the printer is adjusted to operate in accordance with the mean conditions determined. The invention monitors the printing light photoelectrically during the printing of each negative or transparency automatically to adjust the printing conditions of the printer to compensate for any detected change in the intensity of the printing light. The operative color components of the printing light (generally blue, green and red) are monitored separately after the light passes through the filters and before it reaches the negative or transparency being printed, so that correction is made automatically for (a) changes in the light output temperature of the printing lamp resulting from aging or supply voltage fluctuations, (b) changes in the output or color composition of the printing light, and (c) deterioration of the filters.

In a preferred embodiment of the invention, the printing light is allowed to fall upon the photoelectric transducers partly directly from the lamp source without passing through the negative or transparency being printed, and partly indirectly after passing through the negative or transparency. This arrangement is advantageous in that some correction can be made also for the density and color of the negative or transparency, the degree of such correction depending upon the amount of light impinging upon the photoelectric transducers directly from the lamp, which amount can be arranged to be adjustable.

The compensation afforded by the control means in response to changes in the printing light may, depending upon the printing apparatus employed and its mode of operation, be manifest as changes in the positions of graduated density filter wedges or the like in the printing or enlarging light beam to change the color composition of the light beam or may be manifest as changes in the timing of the apparatus with or without variation of the color composition of the beam.

One form of photographic color printing or enlarging apparatus according to this invention described full hereafter is adapted for operation in accordance with the method of color printing wherein, for each negative or transparency printed, the photosensitive printing material is initially exposed with white light and the negative illuminated with white light and the exposure of each color component thereof terminated by the introduction of an appropriate filter into the beam. This photographic color printer or enlarger includes a mounting for a source of printing light, yellow, magenta and cyan subtractive color filters selectively and separately movable into the printing light beam of the apparatus to terminate the exposures of the blue, green and red color components of the photosensitive printing material respectively, and settable timing control apparatus for controlling the instants of introduction of the color filters into the printing light beam. The timing control apparatus includes three photoelectric transducers, each for monitoring one of the color components of the printing light beam and arranged to receive light bypassing the negative or transparency to be printed, to modify the operation of said timing control apparatus to compensate for changes in the beam.

In the above embodiment the arrangement may be such that the printing light beam is monitored before it reaches the negative or transparency to be printed, in which case the compensation afforded by the photoelectric control means will be for changes in the intensity and color composition of the beam. Alternatively, the arrangement may be such that the photoelectric control means monitors a certain amount of the light transmitted through the negative or transparency to be printed as well as light from the printing lamp which bypasses the negative or transparency, in which case not only will compensation be afforded for changes in the printing light beam but also a certain amount of compensation will be afforded for negatives or transparencies whose color composition is not typical of the batch being printed.

In order that this invention might be understood more clearly one embodiment thereof will now be described by way of example only with reference to the accompanying drawing which is a diagrammatic representation of a photographic color printing or enlarging apparatus.

The apparatus illustrated in the drawing has a lamp housing 1 (shown in phantom) wherein there is mounted a printing lamp 2. Light from the lamp is permitted to exit from the housing 1 via an opalescent diffuser plate 3.

A negative holder 4 is situated adjacent the diffuser plate 3 so that a negative 5 held in the holder 4 will be illuminated by light diffusing through plate 3. A schematically illustrated optical system 6 receives light transmitted through the negative 5 and projects it upon photosensitive color printing material 7.

Three photoelectric transducers 8, 9 and 10, sensitive respectively to blue, green and red light only, are so disposed as to receive light which passes directly from the diffuser plate 3 through an aperture 11 in the negative holder 4. A screen 12 prevents light transmitted through the negative 5 from falling upon the photocells 8, 9 and 10 and also prevents light transmitted through aperture 11 in negative holder 4 from falling upon the printing material 7.

The outputs of photoelectric transducers 8, 9 and 10 are each connected to one channel of a schematically illustrated three-channel timing control apparatus 13, the outputs of which each serves, when actuated, to introduce into the printing light beam a respective one of the yellow, magenta and cyan subtractive filters 14, 15, 16 respectively. More particularly each channel of the timing control apparatus 13 includes a capacitor which is arranged to be charged at a rate which is dependent upon the illumination of the respective one of photoelectric transducers 8, 9 and 10. When the charge on the capacitor reaches a predetermined level, a solenoid is operated to move the respective one of filters 14, 15, 16 into the printing light beam. The level to which each capacitor has to be charged in order to cause its associated solenoid to be actuated is arranged to be adjustable.

In operation of the above-described color printer to process (for example) five hundred negatives or transparencies taken under substantially identical conditions, samples (e.g., 10 of the five hundred negatives or transparencies are printed, with the levels at which the solenoids are actuated set by trail-and-error until three level settings, one for each of the three channels of the timing control apparatus 13, are determined which produce satisfactory results for all the sample negatives taken.

The determined levels are then set in the timing control apparatus 13, and printing of the batch of negatives or transparencies is commenced. If, through aging of the lamp 2 the intensity or color composition of the printing light beam, as monitored by the photoelectric transducers 8, 9 and 10, should change, then the time taken for one or more of the capacitors in the timing control apparatus to charge to the preset levels will change so that the printing times for the three color components will change as necessary to compensate for the variation of the printing light.

If the intensity of the light beam should change without its color composition changing, then clearly all three channels of the timing control means will be similarly affected. If, on the other hand, the color composition of the printing light should change so that, for example, the blue component became stronger than the red and green components, then the blue-responsive photoelectric transducer 8 will pass more current so that the actuation level of the solenoid controlling the yellow filter 14 will be reached earlier and the printing of the blue color component will be terminated earlier.

The arrangement above-described and illustrated in the accompanying drawing is adapted only to compensate for fluctuations in the output of the printing lamp 2. As previously mentioned, it could be arranged that light transmitted through the negative or transparency to be printed was also received upon the monitoring photoelectric transducers 8, 9, 10. Then if a negative occurred in the batch of negatives to be printed which for example was strong in cyan i.e., weak in red—such as a girl in a red dress posed against a red brick wall) then the red-responsive photoelectric transducer 10 would receive little red light transmitted through the negative, whereas the blue- and green-responsive photoelectric transducers 8 and 9 would receive considerably more blue and green light transmitted through the negative. Thus the rate of charging of the capacitor would be less than that of the blue and green channels, so that the cyan filter 16 would be introduced last of the three filters into the beam.

It will be appreciated that by removing screen 12 and by arranging that the area of the aperture 11 in the negative holder 4 is adjustable, or by means of a graded neutral density filter placed over the aperture 11, the degree to which compensation will be made for the color composition of the negative being printed may be adjusted.

The three photoelectric transducers could alternatively be sited inside and lamp housing 1 as shown in dotted lines at 8', 9' and 10'. In such an arrangement there would of course be no convenient means of arranging to compensate for the color composition of particular negatives or transparencies.

There has thus been described an apparatus whereby considerably more satisfactory results can be obtained for printing large batches of negatives. Although the invention has been particularly described with reference only to a diagrammatic representation, it is considered that such a description is fully sufficient to enable anyone suitably skilled to put the invention into effect. Details which have been omitted from the foregoing description are in no manner essential to this invention. Moreover it will be appreciated that the teachings of this invention are applicable not only to the color printing or enlarging process specifically described (commonly known as the "subtractive" process) but also are applicable to other processes such as for example the "additive" process wherein separate exposure are made either sequentially or simultaneously for each component color image of the negative or transparency being printed or enlarged.

What is claimed is:

1. Apparatus for monitoring the light output of a light source in a photographic color printing process wherein a plurality of prints are to be made from one or more transparencies or negatives by exposing photosensitive material to light corresponding to three primary colors for respective exposure periods, said prints being made under essentially identical conditions, with color filters being used to determine the color composition of the printing light, and wherein the intensity of the light and said color composition is subject to undesired changes during said process, the improvement comprising three photoelectric transducers, each being responsive to light corresponding to one of said primary colors, means for transmitting a portion of the light from said light source which does not pass through the transparency or negative to be reproduced to said three photoelectric transducers, said light-transmitting means being positioned with respect to said filters and light source so that said light portion passes through a filter which has been inserted into the light path, means for screening said photosensitive material from said light portion, and timing means responsive to said photoelectric transducers for varying each of said exposure periods depending upon the average intensity of the light impinging upon the photoelectric transducer associated therewith.

2. Apparatus according to claim 1, including means for further coupling a portion of the light which has passed through said transparency or negative to said photoelectric transducers.

* * * * *

UNITED STATES PATENT OFFICE
CERTIFICATE OF CORRECTION

Patent No. 3,647,296          Dated March 7, 1972

Inventor(s) John Geoffrey Long

It is certified that error appears in the above-identified patent and that said Letters Patent are hereby corrected as shown below:

Column 1, line 8, before "e.g." insert --(--; line 11, "trail" should read --trial--. Column 2, line 15, "full" should read --fully--. Column 3, line 15, after "10" insert --)--; line 17, "trail" should read --trial--; line 48, before "i.e.," insert --(--. Column 4, line 24, "exposure" should read --exposures--.

Signed and sealed this 5th day of December 1972.

(SEAL)
Attest:

EDWARD M. FLETCHER, JR.          ROBERT GOTTSCHALK
Attesting Officer                Commissioner of Patents